(No Model.) 2 Sheets—Sheet 1.
C. B. WISER.
APPARATUS FOR MAKING BRINE.
No. 380,378. Patented Apr. 3, 1888.
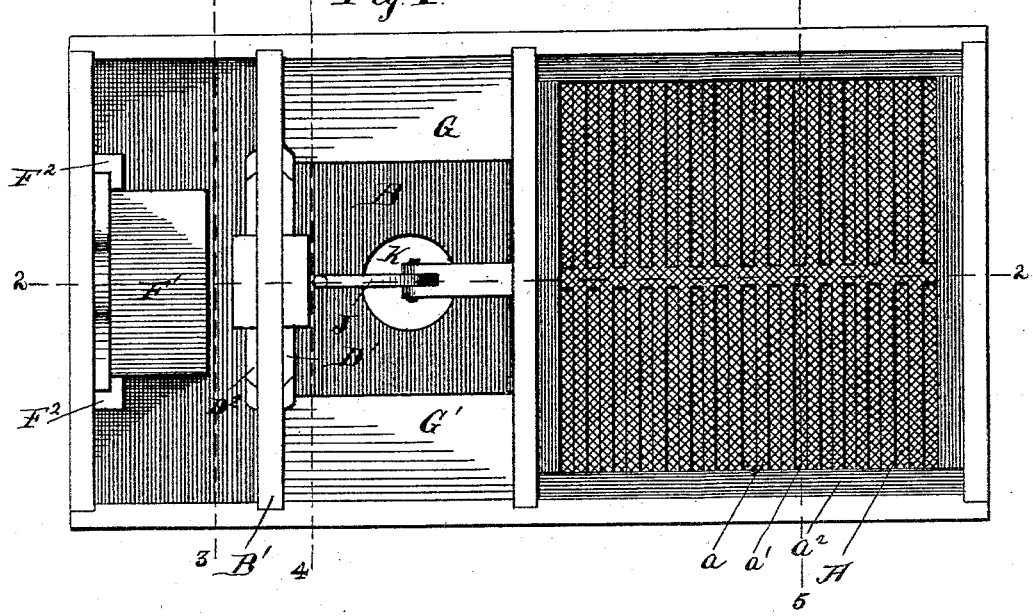
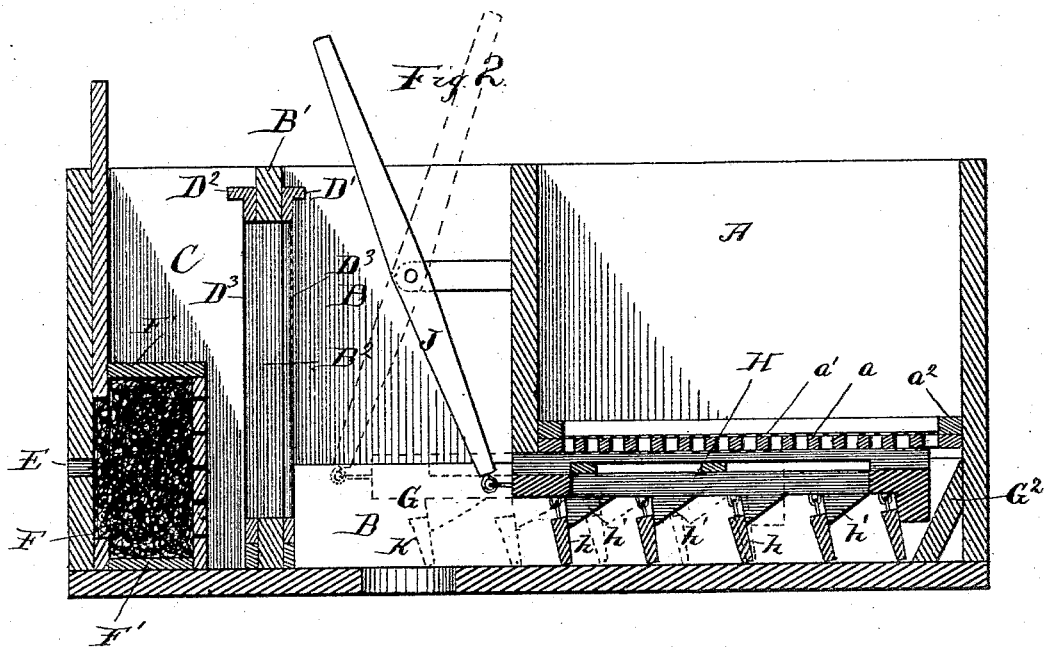
Witnesses:
Lew. C. Curtis
H. W. Munday
Inventor:
C. B. Wiser.
By Munday, Evarts & Adcock.
his Attorneys.
N. PETERS, Photo-Lithographer, Washington, D. C.

(No Model.) 2 Sheets—Sheet 2.
C. B. WISER.
APPARATUS FOR MAKING BRINE.
No. 380,378. Patented Apr. 3, 1888.
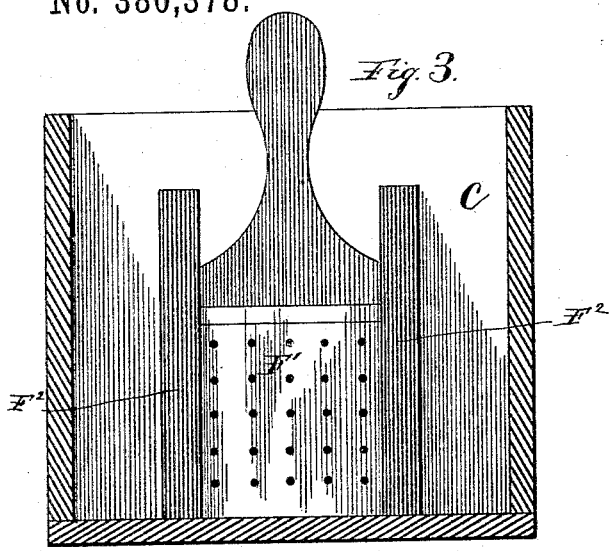
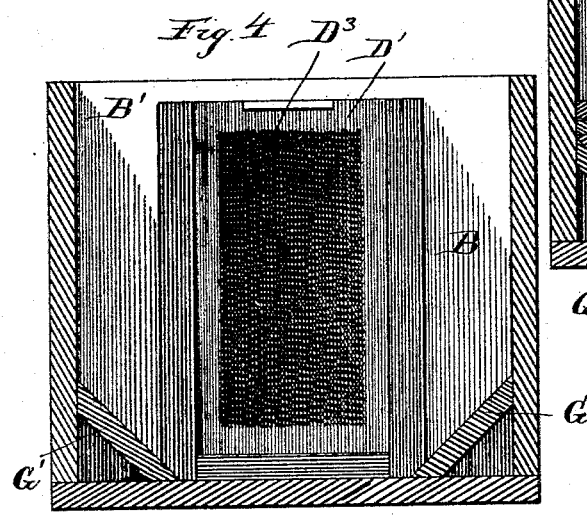
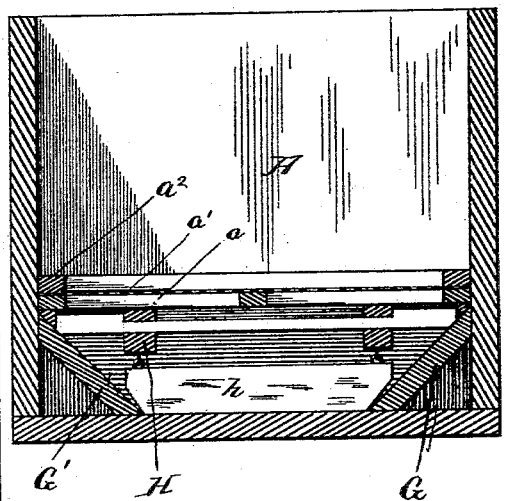
Witnesses:
Lev. C. Curtis.
H. W. Munday.
Inventor:
C. B. Wiser:
By Munday, Evarts & Adcock.
his Attorneys.

UNITED STATES PATENT OFFICE.

CLINTON B. WISER, OF CHICAGO, ILLINOIS, ASSIGNOR TO HIMSELF AND ROBERT B. CROUCH, OF SAME PLACE.

APPARATUS FOR MAKING BRINE.

SPECIFICATION forming part of Letters Patent No. 380,378, dated April 3, 1888.

Application filed July 23, 1887. Serial No. 245,084. (No model.)

*To all whom it may concern:*

Be it known that I, CLINTON B. WISER, a citizen of the United States, residing in Chicago, in the county of Cook and State of Illinois, have invented a new and useful Improvement in Apparatus for Making Brine, of which the following is a specification.

In some of the kinds of salt used for pickling meats is found a greater or less percentage of impurities. Rock-salt, or such as is mined in the crystal condition from the earth, is frequently the best salt known for this purpose; but as it is often discolored, and sometimes contains occluded particles of what is termed "shale," which stains and discolors the brine, objection is made to its use.

It is the purpose of the present invention to contrive a dissolving, settling, and filtering vessel or tank in which brine may be manufactured from such rock or mine salt that shall be clear, unstained, and free from the impurities contained in the salt called "shale." For this purpose I make a large receptacle capable of holding any suitable amount of salt up to several tons. The floor of this receptacle is perforated to permit the water which is run into it and upon the salt to pass down and out into a second chamber placed beneath and beside the salt-chamber, and communicating with a third chamber by a filtering-passage. From the third chamber the brine is drawn off for use through a suitable filtering-aperture. In the second chamber, which acts as a settling-chamber, a scraping apparatus is provided for clearing the bottom from sediment in cleaning out the tank.

In the accompanying drawings, which form a part of this specification, and in which similar letters of reference indicate like parts, Figure 1 is a top or plan view of my improved brine-making tank. Fig. 2 is a longitudinal vertical section on line 2 2 of Fig. 1. Fig. 3 is a cross-section on line 3 3 of Fig. 1. Fig. 4 is a vertical cross-section on line 4 4 of Fig. 1, and Fig. 5 is a vertical cross-section on line 5 5 of Fig. 1.

In said drawings, A represents the salt-chamber, the bottom of which is elevated somewhat above the bottom of the other chambers. The bottom of this chamber is preferably composed of slats or bars $a$, covered in turn by a wire-netting, $a'$, made of such metal as is not easily affected by salt-water. In order to give ready access to every part for cleaning purposes, I prefer to make the wooden grating $a$ removable and to attach the wire-netting $a'$ to a removable frame, $a^2$, so that it may be lifted out readily. B is a settling-chamber, placed beneath and beside the salt-chamber A, with its bottom upon a lower level than said salt-chamber, and C is a third or outlet chamber placed beside the chamber B. These three chambers may be conveniently all contained in one tank, made rectangular in shape, and separated from each other by partitions, as indicated in the drawings, the bottom of the chamber A being elevated above the general bottom of the tank. In the partition B', between the chambers B and C, an opening, $B^2$, is cut, and at each side of this opening a sliding sash-frame, D' $D^2$, is fitted, sustaining a strainer, $D^3$, which I prefer to make of crash toweling or other suitable material, secured to the frame.

The object of having two frames is to permit one of them to be removed from time to time for cleaning, while the other remains in place. In the final or outlet chamber C is the outlet E, placed just below the level of the perforated bottom of the salt-chamber A. In front of this outlet I place a sponge, F, which may be, for convenience, contained in a removable case, F', perforated, so that the brine may percolate through it and reach the opening E, and be held closely against the wall of the tank by guides $F^2$, in which the whole may slide for removal.

The sediment, consisting of the impurities or shale contained in the salt, collects in the second chamber, B, and in order that it may collect more centrally at the bottom and be more readily removed from this chamber I fill the corners on three sides of said chamber B at the bottom with the inclined pieces G G' $G^2$. Beneath the salt-chamber A is a sliding frame, H, one end of which is linked to the lower extremity of the pivoted hand-lever J. To the lower surface of this sliding frame are hinged several scrapers, $h$, backed by stops $h'$. When the hand-lever is operated back and forth, the frame H is reciprocated to and fro and the scrapers are dragged along the bottom of the tank, moving any sediment which may be on the bottom of said tank toward the outlet K in said bottom, which outlet is kept closed at all times, except when the tank is to be cleaned. In moving toward the outlet the scrapers are held in position by the stops $h'$. In moving away from it said scrapers swing on their hinges through the water and pass behind the sediment to be removed.

In operation I fill the chamber A with rock or mine salt and turn upon it a stream of water. The brine thus formed passes down into the chamber B, where it rises to whatever level the water may occupy in chamber A. From chamber B the supernatant brine, freed from the most part of its sediment, filters through the opening $B^2$ into the chamber C, filling that chamber, of course, to the same height as the chamber A is filled with water. From the chamber C the brine is drawn off through the opening E by a suitable pipe (not shown in the drawings) to the pickling vat, tub, or cask, in a clear and purified condition. If the water shall fill the chamber A and the whole vat thus become filled with water, as will sometimes be the case, the apparatus will continue to do its work, because as the salt is dissolved in the chamber A the specific gravity of the water containing it is increased, and the water thus charged sinks to the bottom, while the water not thus charged will rise to the top, there being a current of brine always toward the outlet E. After running the apparatus until a sufficient amount of sediment has collected in the bottom of the chamber B to make a cleaning desirable, the brine is drawn off to a level with the outlet E, the aperture K is opened, and the scrapers are vibrated back and forth, loosening the sediment and allowing it to flow down and out of the said waste-aperture K. From time to time the apparatus may be washed out, or flushed with water to clean it, when not in operation, and when in operation either of the filtering-strainers at the partition D' may be removed and cleaned, and the sponge-chamber in like manner be removed and cleaned if it becomes clogged.

By use of this apparatus a pure, clear, and strong brine, without any discoloration, may be rapidly made from rock or mine salt containing a considerable per cent. of shale or other impurities, thus bringing this superior kind of salt into increased usefulness for this purpose.

Although the apparatus is specially adapted for making brine from rock or mine salt, it will of course be understood that it may be used with advantage upon other kinds of salt containing impurities such as will form a sediment or be removed by filtering.

I claim—

1. The brine-making apparatus consisting of the salt-chamber constructed to contain the charge of salt and to permit the water to flow from it to a settling-chamber, the settling-chamber constructed to allow the brine from the salt-chamber to stand in a body, and the final outlet-chamber, the latter separated from the settling-chamber by a straining or filtering medium and containing the outlet, all combined and operating substantially as specified.

2. The brine-making apparatus consisting of the elevated salt-chamber adapted to contain a body of salt and having a perforated bottom to permit the water to flow from the salt, when added thereto, into the settling-chamber, the settling-chamber having a discharge-outlet in its bottom for removing the sediment, and the outlet-chamber separated from the settling-chamber by a partition provided with a straining device in the partition, substantially as specified.

3. The combination, in a single rectangular vat, of the elevated salt-chamber A, having its floor perforated, the settling-chamber B, partly underlying the salt-chamber A, and the outlet-chamber C, the latter being separated from the settling-chamber by a partition in which is a strainer or filtering device, substantially as specified.

4. The combination of the salt-chamber A, settling-chamber B, and the outlet-chamber C, with a stirring apparatus in the settling-chamber, consisting of a reciprocating hinged scraper, operating in conjunction with the waste-outlet for removing the sediment, substantially as specified.

CLINTON B. WISER.

Witnesses:
H. M. MUNDAY,
EDMUND ADCOCK.